(12) United States Patent
Suchecki

(10) Patent No.: US 9,611,920 B2
(45) Date of Patent: Apr. 4, 2017

(54) CHAIN TENSIONER FORCE MECHANISM FOR INTERNAL COMBUSTION ENGINE

(71) Applicant: Ford Global Technologies, LLC, Dearborn, MI (US)

(72) Inventor: Thomas Suchecki, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 14/511,713

(22) Filed: Oct. 10, 2014

(65) Prior Publication Data

US 2016/0102736 A1  Apr. 14, 2016

(51) Int. Cl.
*F01L 1/02* (2006.01)
*F16H 7/08* (2006.01)
*F01L 1/047* (2006.01)

(52) U.S. Cl.
CPC ............ *F16H 7/08* (2013.01); *F01L 1/022* (2013.01); *F01L 1/047* (2013.01); *F16H 2007/0812* (2013.01); *F16H 2007/0842* (2013.01); *F16H 2007/0872* (2013.01); *F16H 2007/0893* (2013.01); *F16H 2007/0897* (2013.01)

(58) Field of Classification Search
CPC .. F01L 1/022; F01L 1/047; F16H 7/08; F16H 2007/0842; F16H 2007/0812

USPC ............................................ 123/90.31, 90.27
See application file for complete search history.

(56) References Cited

U.S. PATENT DOCUMENTS

| 5,967,922 A | 10/1999 | Ullein et al. |
| 8,142,313 B2* | 3/2012 | Suchecki ............... F02B 67/06 474/109 |
| 8,708,848 B2 | 4/2014 | Wake |
| 2013/0023367 A1 | 1/2013 | Markley |

* cited by examiner

*Primary Examiner* — Ching Chang
(74) *Attorney, Agent, or Firm* — LeClairRyan

(57) ABSTRACT

A tensioner force assembly is provided for applying tension to an engine timing chain that changes the direction of the force acting on a chain tensioning arm such that the tensioner piston is oriented in parallel with the long axis of the crankshaft. The tensioner assembly includes a crankshaft sprocket attached to the crankshaft, a cam shaft sprocket attached to the cam shaft, and a timing chain engaging the sprockets. A timing chain tensioner is pivotally attached to the engine block. A chain tensioner mechanism is provided that takes up timing chain slack. The chain tensioner mechanism includes a pivotable force transfer mechanism, a cylinder body having a long axis parallel to the long axis of the crankshaft, and a reciprocating tensioner piston in the body and engaged with the transfer mechanism for moving the transfer mechanism to apply required tension to the timing chain through the timing chain tensioner.

15 Claims, 3 Drawing Sheets

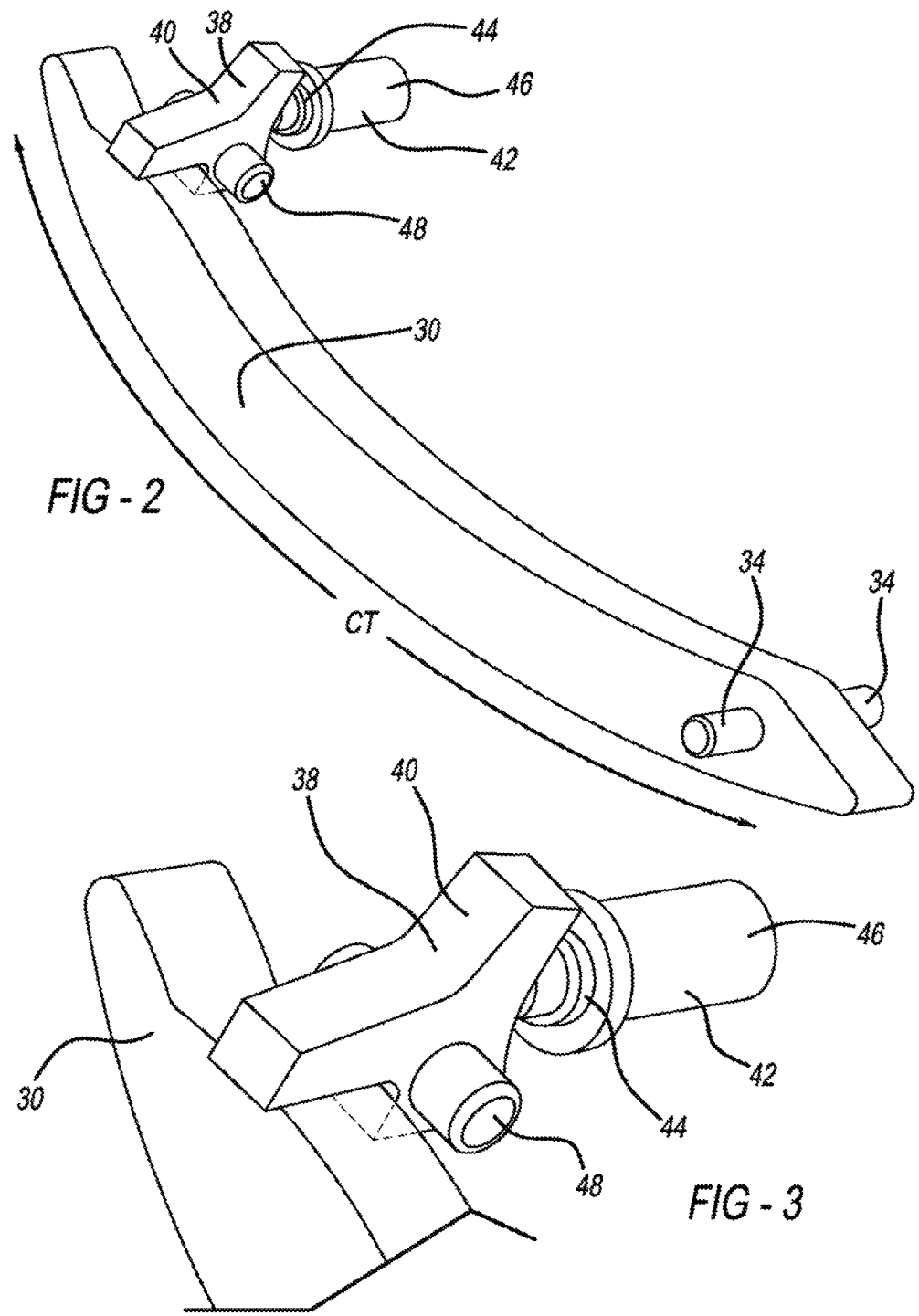

CHAIN TENSIONER FORCE MECHANISM FOR INTERNAL COMBUSTION ENGINE

TECHNICAL FIELD

The disclosed inventive concept relates generally to chain tensioners used in conjunction with timing chains in internal combustion engines. More particularly, the disclosed inventive concept relates to a chain tensioner mechanism that changes the direction of the force acting on a chain tensioning arm such that the tensioner piston is oriented in parallel with the long axis of the crankshaft.

BACKGROUND OF THE INVENTION

The modern internal combustion engine incorporates chain guides and chain tensioners in relation to valvetrain or balanceshaft chain drive systems. Such chains replace, for example, gears and timing belts that connect the crankshaft with the camshafts. While providing superior performance and durability when compared with earlier approaches to linking the crankshaft and the camshafts, timing chains must operate under a predetermined amount of tension to minimize wear and to reduce both vibration and noise.

To answer this need, a timing chain is placed under tension over its entire travel by one or more chain tensioners. Chain tensioning arms commonly provided in internal combustion engines respond to longitudinal stretching of the chain and control longitudinal and transverse vibrations of the chain, which may be caused by excitations arising from the camshaft, the crankshaft and associated components. Chain guides are used in conjunction with the chain tensioning arms to maintain the proper course of chain travel.

Chain tensioning arms apply tension to the timing chain of the engine through tensioning mechanisms. Such mechanisms may be mechanically or hydraulically driven. While providing generally satisfactory results, known tensioning mechanisms are bulky and difficult to package in the given engine space. As automotive engines get smaller and more efficient to satisfy consumer demand and government regulation, engine timing drive systems must occupy a smaller footprint. Known technologies generally fail to minimize the size of the timing chain system.

As in so many areas of vehicle technology there is always room for improvements related to the design of timing chain tensioning systems as used in the internal combustion engine.

SUMMARY OF THE INVENTION

The disclosed invention overcomes the problems of known timing chain tensioner arrangements by providing a mechanism that changes the direction of the force acting on a chain tensioning arm such that the tensioner piston is oriented in parallel with the long axis of the crankshaft. By orienting the tensioner in this manner, the overall size of the engine can be significantly reduced thus allowing the engine timing drive to occupy a smaller footprint.

The tensioner assembly of the disclosed inventive concept is usable with an internal combustion engine having a crankshaft and a cam shaft rotatably mounted in an engine block. The crankshaft has a long axis. The tensioner assembly includes a crankshaft sprocket attached to the crankshaft, a cam shaft sprocket attached to the cam shaft, and a timing chain engaging the sprockets.

A timing chain tensioner is pivotally attached to the engine block. A chain tensioner mechanism is provided that takes up timing chain slack as needed. The chain tensioner mechanism includes a pivotable force transfer mechanism, a cylinder body having a long axis parallel to the long axis of the crankshaft, and a reciprocating tensioner piston in the body and engaged with the pivotable force transfer mechanism for moving the transfer mechanism to apply required tension to the timing chain through the timing chain tensioner.

According to a first embodiment of the disclosed inventive concept, the pivotable force transfer mechanism includes a press-fitted pivot pin that is pivotally mounted in the engine block. According to a second embodiment of the disclosed inventive concept, the pivotable force transfer mechanism includes a pivot stud integrally formed therewith. The pivot stud is pivotally mounted in the engine block.

The reciprocating piston may be mechanically driven, pneumatically driven, or driven by a combination of pneumatic force and mechanical force.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 2 illustrates a perspective view of a chain tensioning arm having a chain tensioner mechanism according to the disclosed inventive concept;

FIG. 3 illustrates a perspective view of the chain tensioner mechanism of the disclosed inventive concept.

DETAILED DESCRIPTION OF THE PREFERRED EMBODIMENT

Figure 1:
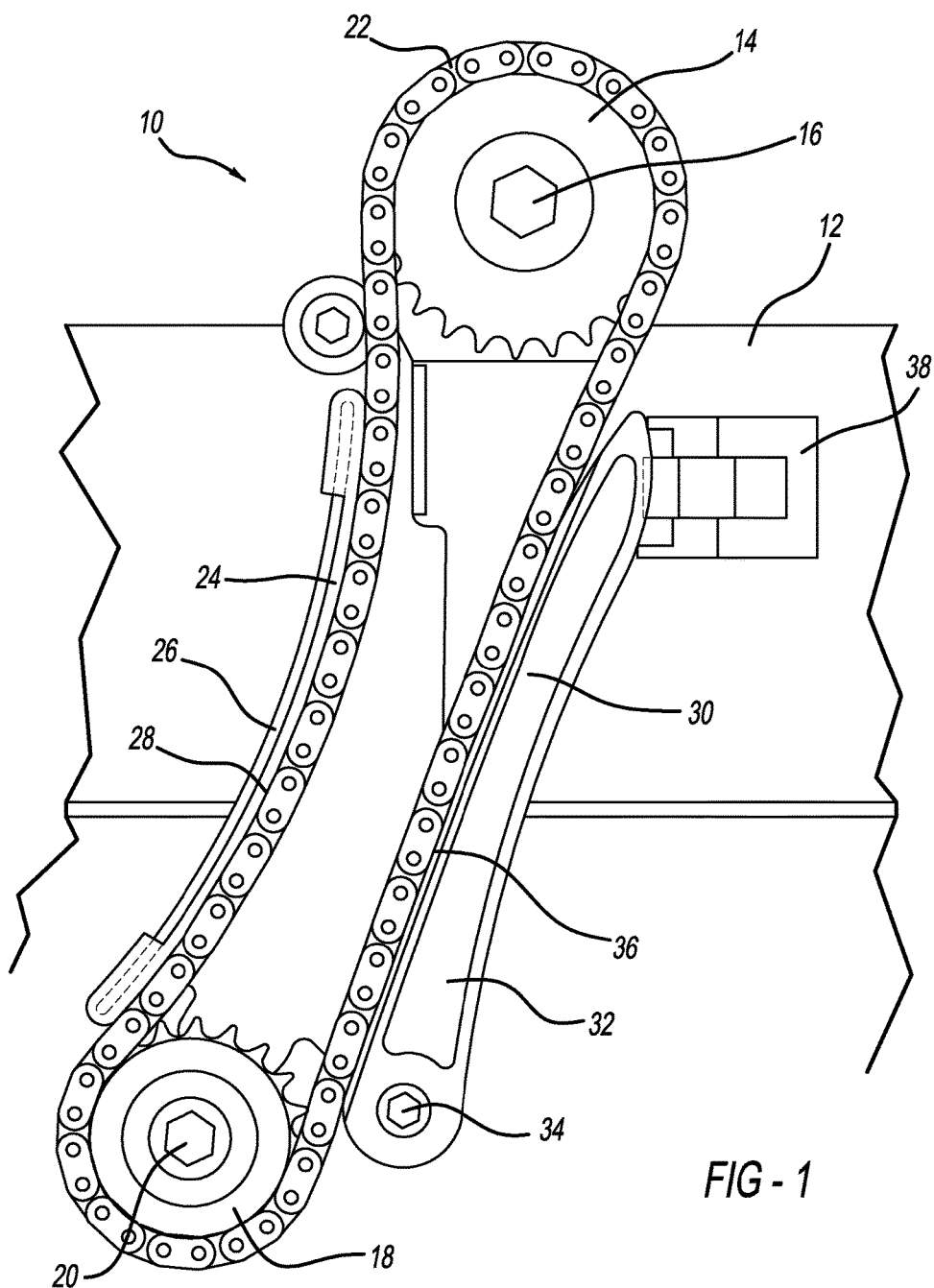
FIG. 1 is a schematic illustration of a part of an internal combustion engine with a continuously running chain led over the chain tensioning arm having a chain tensioner mechanism according to the disclosed inventive concept.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a chain tensioner mechanism that changes the direction of the force acting on a chain tensioning arm such that the tensioner piston is oriented in parallel with the long axis of the crankshaft. More particularly, and referring to FIG. 1, a schematic illustration of a part of an internal combustion engine with a continuously running chain led over the chain tensioning arm having a chain tensioner mechanism according to the disclosed inventive concept is shown, generally illustrated as 10. The engine 10 is intended as being illustrative and not limiting and it is thus to be understood that the disclosed inventive concept can have a wide variety of applications to virtually any chain drive system having either or both a chain tensioning arm and a chain guide.

As shown in FIG. 1, the engine 10 includes an engine block 12, of which only a portion is illustrated. The engine 10 further includes a camshaft sprocket 14 fitted to a camshaft 16. While only one camshaft 16 and associated camshaft sprocket 14 are illustrated, it is to be understood that a similar arrangement having two camshafts may be suitable as well for the disclosed inventive concept. The engine 10 further includes a crankshaft sprocket 18 fitted to a crankshaft 20.

A timing chain 22 is trained over the camshaft sprocket 14 and the crankshaft sprocket 18. A timing chain guide 24 having a chain guide body 26 is attached to the engine block 12 and provides a guide for the timing chain 22. The timing chain guide 24 is formed from nylon or a similar aliphatic polyamide. The chain guide body 26 includes a timing chain contact surface 28 having a wear-resistant material provided thereon.

A chain tensioning arm 30 having a chain tensioning arm body 32 is pivotably attached to the engine block 12 by a bolt 34. The chain tensioning arm 30 is preferably formed from nylon or a similar aliphatic polyamide. The chain tensioning arm 30 applies a constant pressure to the timing chain 22 to thereby maintain appropriate tension during engine operation. The chain tensioning arm 30 includes a timing chain contact surface 36 having a wear-resistant material provided thereon.

A chain tensioner mechanism assembly 38 applies an appropriate tension to the end of the chain tensioning arm 30 opposite the end of the chain tensioning arm 30 attached to the engine block 12 by the shoulder bolt 34. The chain tensioner mechanism assembly 38 is more fully understood by reference to FIGS. 2 and 3.

FIG. 2 illustrates a perspective view of the chain tensioning arm 30 and the chain tensioner mechanism assembly 38. The chain tension (CT) is created along the timing chain contact surface 36. FIG. 3 illustrates a perspective view of the chain tensioner mechanism assembly 38. Referring to both FIGS. 2 and 3, the chain tensioner mechanism assembly 38 includes a pivotable force transfer mechanism 40 attached to a drive element 42. The drive element 42 includes a tensioner piston 44 movably positioned within a cylinder body 46. The cylinder body 46 includes a hollow cylinder within which the tensioner piston 44 can move axially. The cylinder body 46 is fitted to the engine block 12. The long axis of the cylinder body 46 is in axial alignment with the long axis of the engine's crankshaft.

The drive element 42 may be pneumatically operated, mechanically operated via a resilient member such as a spring, or a combination of the two. Hydraulic pressure may be created by a pressurized oil fluid supply, typically from the engine's lubricant supply.

A pivot pin 48 is press-fitted into the pivotable force transfer mechanism 40 and is rotatably mounted in the cylinder block 12. The pivot pin 48 enables the pivotable force transfer mechanism 40 to pivot in response to the reciprocating movement of the tensioner piston 44.

Figure 4:
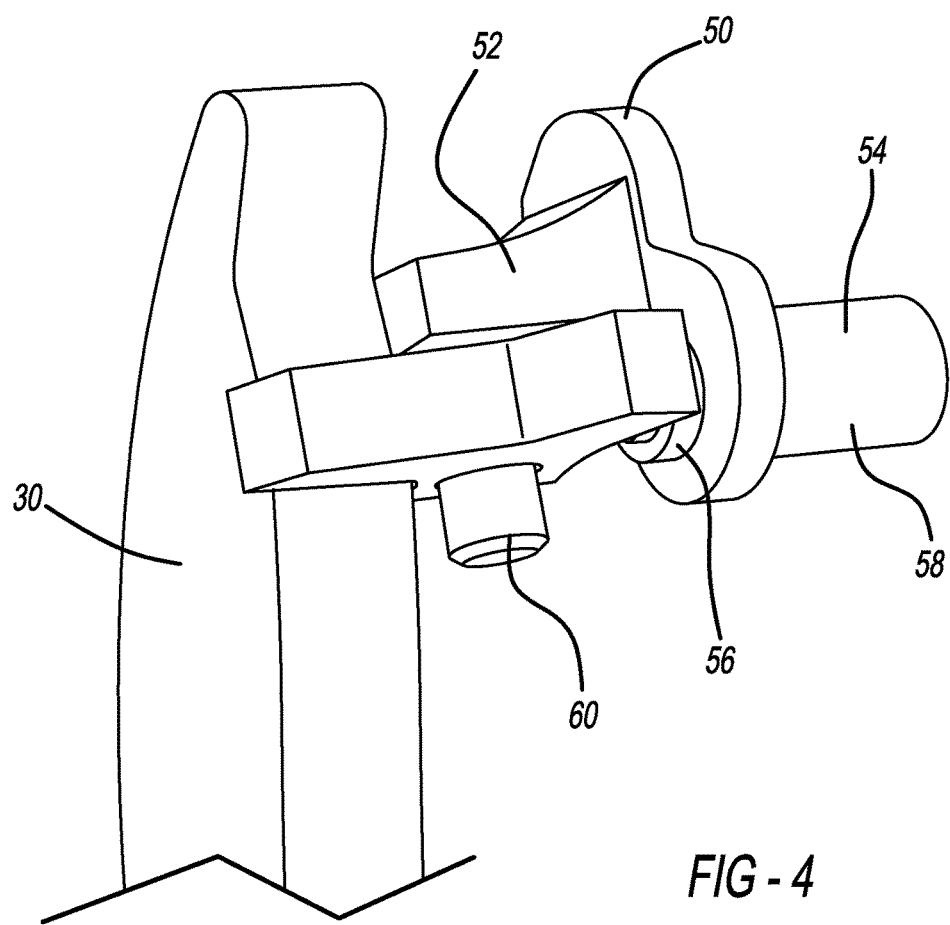
FIG. 4 illustrates a perspective view of an alternative embodiment of the chain tensioner mechanism of the disclosed inventive concept.

An alternative embodiment of the chain tensioner mechanism assembly according to the disclosed inventive concept is illustrated in FIG. 4. In that figure, a chain tensioner mechanism assembly 50 is illustrated. The chain tensioner mechanism assembly 50 includes a pivotable force transfer mechanism 52 attached to a drive element 54. Like the chain tensioner mechanism assembly 36 illustrated in FIGS. 2 and 3 and discussed in relation thereto, the drive element 54 is a preferably though not necessarily a hydraulic element that includes a tensioner piston 56 movably positioned within a cylinder 58. The cylinder 58 is also fitted to the engine block 12. The tensioner piston 56 interfaces with the pivotable force transfer mechanism 52.

A pivot stud 60 is integrally formed with the pivotable force transfer mechanism 52 and is rotatably mounted in the cylinder block 12. The pivot stud 60 enables the pivotable force transfer mechanism 52 to pivot in response to the reciprocating movement of the tensioner piston 56.

As noted above, chain tensioner mechanism assembly 38 (or 50) changes the direction of the force acting on the chain tensioning arm 30 such that the tensioner piston 44 (or 56) is oriented in parallel with the long axis of the crankshaft.

In operation, the mechanical force or the hydraulic force or a combination of the two are balanced against the timing chain 22 riding against the tensioner piston 44 (or 56). Particularly, when there is slack in the timing chain 22, pneumatic or mechanical forces push the tensioner piston 44 or (56) out of the cylinder body 46 (or 58) and apply force to the pivotable force transfer mechanism 40 (or 52) causing increased chain tension on the timing chain 22 and thus the slack is taken up.

On the other hand, when there is an increased tension in the timing chain 22 due to, for example, a rapidly changing engine speed, the force that the timing chain 22 exerts on tensioner piston 44 (or 56) causes the tensioner piston 44 (or 56) to retreat into cylinder body 46 (or 58) to establish a new equilibrium of forces, i.e., the force of the chain balances spring and hydraulic forces.

By allowing the pivotable force transfer mechanism 40 (or 52) to act perpendicular to the shiv line of the timing chain 22, the disclosed inventive concept allows for the reduction of overall size of the engine by a significant degree. The reduction of necessary space in no way compromises the effectiveness of the operation of the chain tensioner mechanism assembly 38 (or 50).

One skilled in the art will readily recognize from such discussion and from the accompanying drawings and claims that various changes, modifications and variations can be made therein without departing from the true spirit and fair scope of the invention as defined by the following claims.

What is claimed is:

1. A chain tensioner assembly for an internal combustion engine having a block and a crankshaft, the crankshaft having a long axis, the chain tensioner assembly comprising:
   chain sprockets;
   a timing chain engaging said chain sprockets;
   a timing chain tensioner;
   the timing chain tensioner, comprising:
      a pivotable force transfer mechanism, a cylinder body having a long axis parallel to the long axis of the crankshaft, and a reciprocating tensioner piston in said cylinder body for moving said pivotable force transfer mechanism.

2. The chain tensioner assembly for an internal combustion engine of claim 1 wherein said cylinder body is fitted to the engine block.

3. The chain tensioner assembly for an internal combustion engine of claim 1 wherein said pivotable force transfer mechanism includes a press-fitted pivot pin.

4. The chain tensioner assembly for an internal combustion engine of claim 3 wherein said press-fitted pivot pin is pivotally mounted in the engine block.

5. The chain tensioner assembly for an internal combustion engine of claim 1 wherein said reciprocating tensioner piston is pneumatically driven.

6. A chain tensioner assembly for an internal combustion engine having a block and a crankshaft, the crankshaft having a long axis, the chain tensioner assembly comprising:
- a camshaft sprocket;
- a crankshaft sprocket attached to the crankshaft;
- a timing chain engaging said crankshaft and said camshaft sprockets;
- a timing chain tensioner;
- the timing chain tensioner, comprising:
  - a cylinder body, said cylinder body having a long axis parallel to the long axis of the crankshaft; and
  - a reciprocating tensioner piston fitted in said cylinder body.

7. The chain tensioner assembly for an internal combustion engine of claim 6 wherein said cylinder body is fitted to the engine block.

8. The chain tensioner assembly for an internal combustion engine of claim 6 further including a pivotable force transfer mechanism fitted between said timing chain tensioner and said chain tensioner.

9. The chain tensioner assembly for an internal combustion engine of claim 8 wherein said pivotable force transfer mechanism includes a press-fitted pivot pin.

10. The chain tensioner assembly internal combustion engine of claim 9 wherein said press-fitted pivot pin is pivotally mounted in the engine block.

11. The chain tensioner assembly for an internal combustion engine of claim 6 wherein said reciprocating tensioner piston is pneumatically driven.

12. An internal combustion engine comprising:
- a block;
- a crankshaft having a long axis mounted in said block;
- a crankshaft sprocket:
- a camshaft;
- a camshaft sprocket;
- a timing chain engaging said camshaft sprocket and said crankshaft sprocket;
- a timing chain tensioner;
- a pivotable force transfer mechanism associated with said timing chain tensioner;
- a cylinder body having a long axis parallel to the long axis of said crankshaft; and a reciprocating tensioner piston movably fitted in said cylinder body.

13. The internal combustion engine of claim 12 wherein said cylinder body is fitted to said engine block.

14. The internal combustion engine of claim 12 wherein said pivotable force transfer mechanism includes a press-fitted pivot pin, said press-fitted pin being pivotally mounted in said engine block.

15. The internal combustion engine of claim 12 wherein said reciprocating tensioner piston is pneumatically driven.

* * * * *